United States Patent
Panaioli et al.

(10) Patent No.: US 7,678,401 B2
(45) Date of Patent: Mar. 16, 2010

(54) BLANCHING VEGETABLES

(75) Inventors: Sandro Panaioli, Cisterna di Latina (IT);
Carlo Rotunno, Cisterna di Latina (IT);
Valerio Simeone, Cisterna di Latina (IT)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 929 days.

(21) Appl. No.: 10/917,052

(22) Filed: Aug. 12, 2004

(65) Prior Publication Data
US 2005/0037118 A1     Feb. 17, 2005

(30) Foreign Application Priority Data
Aug. 13, 2003   (GB)   ................... 0319040.2

(51) Int. Cl.
*A23B 4/00*   (2006.01)
(52) U.S. Cl. ................. 426/509; 426/237; 426/520; 426/521; 426/241
(58) Field of Classification Search ............... 426/241, 426/102, 244, 248, 521, 520, 506–511, 242–243
See application file for complete search history.

(56) References Cited

U.S. PATENT DOCUMENTS

| | | | | |
|---|---|---|---|---|
| 592,735 | A * | 10/1897 | Jones | ................ 204/242 |
| 2,373,521 | A * | 4/1945 | Wigelsworth | ............... 426/510 |
| 2,692,200 | A * | 10/1954 | Olson | ................ 426/508 |
| 3,409,447 | A | 11/1968 | Jeppson | |
| 3,450,544 | A * | 6/1969 | Lorenzo et al. | ............. 426/415 |
| 3,578,463 | A | 5/1971 | Smith et al. | |
| 3,910,175 | A | 10/1975 | Smith | |
| 4,035,925 | A | 7/1977 | Brown et al. | |
| 4,297,377 | A | 10/1981 | Harney et al. | |
| 4,457,221 | A * | 7/1984 | Geren | .................. 99/451 |
| 4,547,380 | A * | 10/1985 | Bengtsson et al. | .......... 426/302 |
| 5,290,580 | A * | 3/1994 | Floyd et al. | .................. 426/524 |
| 5,334,619 | A * | 8/1994 | Vaughn et al. | ............. 514/675 |
| 5,415,882 | A * | 5/1995 | Knipper et al. | ............. 426/237 |
| 5,776,529 | A * | 7/1998 | Qin et al. | .................... 426/231 |
| 5,834,871 | A * | 11/1998 | Puskas | ................. 310/316.02 |
| 5,837,303 | A * | 11/1998 | Hayden | ..................... 426/237 |
| 5,858,430 | A * | 1/1999 | Endico | ........................ 426/241 |
| 5,858,435 | A * | 1/1999 | Gallo | ........................ 426/320 |
| 5,862,821 | A * | 1/1999 | Rodriguez | ................... 134/65 |
| 6,537,600 | B1 * | 3/2003 | Meldrum | .................... 426/102 |

FOREIGN PATENT DOCUMENTS

| | | |
|---|---|---|
| EP | 498 972 | 1/1995 |
| EP | 0 768 037 | 12/2001 |
| GB | 963 473 | 7/1964 |
| GB | 1299009 | 12/1972 |
| GB | 2005983 | 5/1979 |

OTHER PUBLICATIONS http://web.archive.org/web/20000707231126/http://www.positivehealth.com/permit/Articles/Regular/safron23.htm.*

* cited by examiner

*Primary Examiner*—Drew E Becker
*Assistant Examiner*—Steven Leff
(74) *Attorney, Agent, or Firm*—Michael P. Aronson

(57) ABSTRACT

A method for blanching vegetable material comprising heat treating the vegetable material in a current of hot air at a temperature in the range from above 100° C. to 150° C. in an environment which substantially reduces evaporative loss of water from the vegetable material.

13 Claims, No Drawings

BLANCHING VEGETABLES

BACKGROUND OF INVENTION

This invention relates to a method of blanching vegetable material and in particular to a method of blanching vegetable material prior to freezing.

Most vegetables require a short heat treatment or blanching to inactivate enzymes and kill bacteria. The blanching stabilises the quality of the vegetables prior to and during frozen storage.

Several types of blanching methods are known. Vegetables may be blanched in hot water, e.g. by transferring the vegetables from a container with cold washing water to successive containers containing water of increasing temperatures, e.g. up to 98° C., and finally to a container with cold water for cooling it down again. Alternatively, the vegetables may be passed on a belt through a bath of hot water, e.g. at 98° C., and then into cold water. Blanching methods using steam are also known. The vegetables may be conveyed on a belt with steam jets directed from the top and bottom to cause rapid heating. The vegetables are then cooled in cold water. In some instances cold water sprays are used instead of immersion cooling in cold water in order to prevent excessive leaching of nutrients. Ambient air may also be used to cool vegetables by drawing air through the vegetables causing convection cooling and evaporative cooling.

EP-A-498972 discloses a blanching or part-cooking process in which the vegetable material is contacted with saturated steam while it is supported on a moving conveyor and while it is not submerged in a liquid and exposing the vegetable material at least during part of this treatment with microwave radiation. In one embodiment the heat treated vegetable material is subsequently cooled down by contacting it with finely divided water (liquid or solid) having a temperature not exceeding 5° C. and preferably having a temperature between 0° C. and −10° C. It is stated that the vegetables have a better texture and taste compared with those treated with steam or hot water and cooled in running water.

It is an object of the present invention to provide an alternative blanching method.

BRIEF SUMMARY OF THE INVENTION

According to the present invention there is provided a method for blanching vegetable material comprising heat treating the vegetable material in a current of hot air at a temperature in the range from above 100° C. to 150° C. in an environment which substantially reduces evaporative loss of water from the vegetable material.

Thereafter the vegetable material may be frozen. If the vegetable material is chilled prior to freezing the chilling process does not involve immersion in water. Suitable chilling processes include impingement of ambient cold gas, super contact etc. Thereafter the vegetables are frozen in a conventional manner.

The invention provides a simple, effective blanching process which retains the flavour and nutritional elements of the vegetable. The vegetables have improved taste and texture compared with blanching and chilling processes involving immersion in water.

The blanching process of the invention is applicable to a wide range of vegetables suitable for freezing including potatoes, carrots, cauliflower, broccoli, paprika, green beans, zucchini, aubergines and leaf vegetables such as spinach. The invention is particularly suitable for blanching spinach.

The vegetables for blanching are prepared in the normal manner. The precise preparation process will depend upon the particular vegetable. For example, in the case of spinach the leaves are washed with air to remove dirt, insects, etc., and washed with cold water. The vegetables are cleaned and may be peeled, sliced or diced, etc.

The vegetable material is preferably subjected to microwave heating before heating with hot air. The microwave heating rapidly raises the temperature of the vegetable material and ensures the core of the vegetable is heated. The vegetable material may conveniently be conveyed through a microwave oven on a conveyor. The exposure to microwave heating depends upon the power of the microwave emitters, the particular vegetable material being treated and the amount of vegetable material in the microwave oven. In general, the vegetable is subjected to microwave heating up to 6 minutes e.g. for a period of from 4 to 6 minutes.

DETAILED DESCRIPTION OF THE INVENTION

Following microwave heating, the vegetable material is subjected to blanching comprising heat treating in a current of hot air at a temperature in the range 100° C. to 150° C. The heating is conducted in an environment which prevents loss of water from the vegetable material and this may readily be achieved by introducing steam into the oven. It should be noted that the purpose of the steam is to prevent the vegetable material drying out and the heat treatment is not equivalent to steam blanching in which copious amounts of steam are directed over the vegetable matter causing the vegetable matter to become saturated with steam and leaching nutrients from the vegetable matter. In contrast, the vegetable material is heat treated by impinging a high velocity air stream having a temperature of from above 100° C. to 150° C. e.g. 120° C. on the vegetable material. In general, jet stream ovens can operate with an atmosphere comprising up to 85% volume water vapour and 15% volume air. At 100° C. 15% volume air and 85% volume water provides a relative humidity of 83%. At 150° C. such a concentration of stream and air provides a relative humidity of about 18%. The hot air heating of the invention is conducted at temperatures above 100° C. at ambient pressure and generally the atmosphere in the oven comprises at least 50% by volume water vapour. The heat treatment process may conveniently be conducted in a jet stream oven in which the vegetable material is conveyed through the oven on a conveyor and a series of nozzles positioned above the vegetable material directs high velocity hot air onto the vegetable material to cause heating. The jets are generally positioned a distance of from 3 to 10 cm above the vegetable material. The air flow is generally in the range 5 to 30 m/s. The conveyor may be a solid or grid belt.

Following blanching with hot air the vegetable material is preferably frozen. The vegetable material may be frozen directly after exiting the hot air oven or may be subjected to cooling steps prior to freezing. The vegetable material may be cooled by any suitable process which does not involve immersion in water since this would leach nutrients from the vegetable material. Suitable cooling techniques include the use of cold air, carbon dioxide and/or using a product surface freezer, such as SuperContact, which is a mechanical freezing process in which the product is carried on a thin continuous film conveyor over a low temperature plate filled with recirculating refrigerant.

The vegetable material may be portioned, shaped and/or mixed with other ingredients prior to freezing.

The process of the invention does not use water or steam for heating and cooling and therefore does not remove elements such as nitrates or nutrients and vitamins from the vegetable material. Because the process does not remove such elements, it is important to ensure that the level of nitrate in the fresh vegetable is within acceptable limits. For example, the acceptable level for nitrate in spinach is less than 2000 ppm. Under certain conditions the level of nitrate in fresh spinach may exceed this level particularly if the spinach is harvested in months when there is less daylight. Thus, it is important to monitor the nitrate level of the fresh spinach. The level of nitrate in the spinach stalk is higher than in the leaf and therefore the nitrate content of spinach may be reduced by cutting the stalk close to the leaf.

Examples

In an exemplary process, leaf spinach was washed with air and cold water and laid on a solid flat belt conveyor to a depth of about 3 cm. The spinach was passed through a microwave oven having a series of microwave emitters above the conveyor belt. In the jet stream oven the steam flow was 560 kg/h and the air flow was about 25 m/s. The spinach was exposed to microwave radiation for a period of between 4 and 5 minutes. Thereafter the spinach was transferred to a grid conveyor and passed through a jet stream oven having nozzles position about 5 cm above the spinach directing high velocity air at a temperature of 120° C. The microwave oven comprises 120 magnetrons, 55 directed upwardly from below the conveyor and 65 directed downwardly from above the conveyor. Each magnetron was 2.8 kW providing a maximum output for the oven of 336 kW at 2450 MHz. Only the downwardly directed magnetrons were used. The spinach was treated in the jet stream oven for a period of about 4 minutes.

After exiting the oven the spinach was cooled by Supercontact, portioned and frozen.

Samples of the frozen spinach were cooked and compared to spinach which had been blanched with hot water. The flavour of the spinach treated in accordance with the invention was stronger and the texture of the spinach was firmer and crisper compared with the spinach which had been treated by water blanching.

The invention claimed is:

1. A method for blanching vegetable material comprising the steps of:
   (a) heat treating the vegetable material in a current of hot air at a temperature in the range from 100° C. to 150° C. in an atmosphere which comprises at least 50% by volume of water vapor up to 85% by volume of water vapor wherein heating is provided by a jet stream oven comprising jet nozzles which direct hot air onto the vegetable material, said nozzles positioned a distance of from 3 to 10 cm above the vegetable material; followed directly by
   (b) chilling the vegetable material with cold air, carbon dioxide and/or using a product surface freezer by a process that does not use water; and then
   (c) freezing the vegetable material.

2. A method as claimed in claim 1 in which the jet stream oven comprises jet nozzles positioned a distance of about 5 cm above the vegetable material.

3. A method as claimed in claim 1 in which the airflow is in the range 5 to 30 m/s.

4. A method as claimed in claim 1 in which the hot air has a temperature of about 120° C.

5. A method as claimed in claim 1 in which the jet stream oven has an atmosphere comprising about 85% by volume water vapour.

6. A method as claimed in claim 1 in which the vegetable material is subjected to microwave heating prior to the heat treatment with hot air.

7. A method as claimed in claim 1 in which the vegetable material is selected from potatoes, carrots, cauliflower, broccoli, paprika, green beans, zucchini, aubergines and leaf vegetables such as spinach.

8. A method as claimed in claim 7 in which the vegetable material is spinach.

9. A method as claimed in claim 8 in which the spinach is supported on a conveyor as a layer having a thickness of from 2 to 5 cm as it is heat treated with air and/or subjected to microwave heating.

10. A method as claimed in claim 8 in which the spinach is subjected to microwave heating for a period of from 4 to 6 minutes and heat treated with hot air for a period of from 3 to 6 minutes.

11. A method as claimed in claim 8 in which the spinach is portioned after heat treatment and before freezing.

12. A method as claimed in claim 8 in which the spinach has a nitrate concentration of less than 2000 ppm prior to the heat treatment.

13. A method as claimed in claim 1 wherein the vegetable material is chilled in step b) using a product surface freezer.

* * * * *